Jan. 14, 1947.    P. W. ROBINSON    2,414,331
MOTOR OVERLOAD PROTECTION
Filed April 12, 1945    3 Sheets-Sheet 2

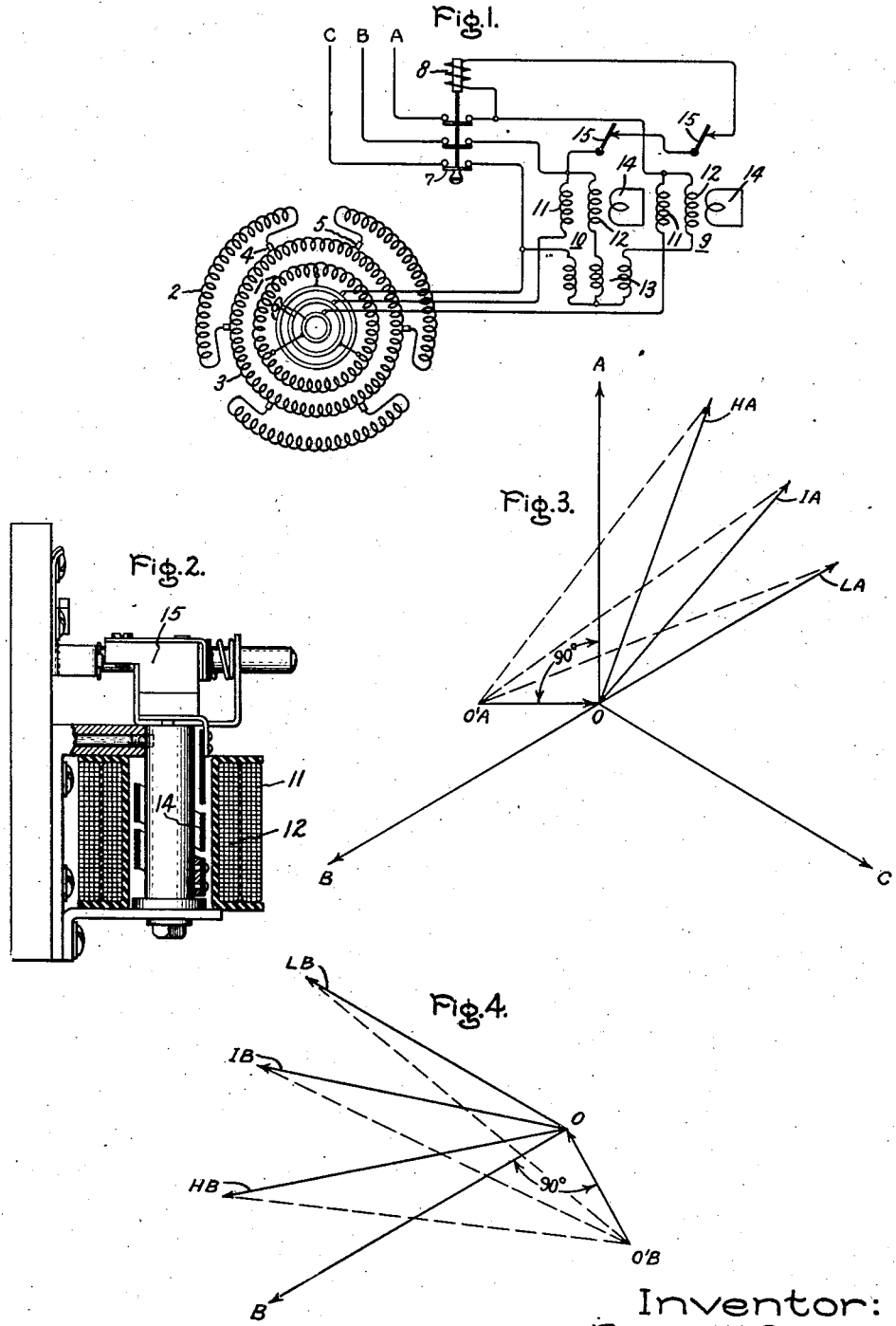

Inventor:
Percy W. Robinson,
by Harry E. Dunham
His Attorney.

Jan. 14, 1947.  P. W. ROBINSON  2,414,331
MOTOR OVERLOAD PROTECTION
Filed April 12, 1945   3 Sheets-Sheet 3

Inventor:
Percy W. Robinson,
by Harry E. Dunham
His Attorney.

Patented Jan. 14, 1947

2,414,331

UNITED STATES PATENT OFFICE 2,414,331

MOTOR OVERLOAD PROTECTION

Percy W. Robinson, Scotia, N. Y., assignor to General Electric Company, a corporation of New York Application April 12, 1945, Serial No. 588,015

7 Claims. (Cl. 175—294)

My invention relates to overload relay protection for alternating current apparatus such as variable speed alternating current motors, and its object is to provide protection in a simple manner, taking into consideration the fact that the permissible full load current may vary appreciably under different conditions. As an example, with variable speed commutator motors of the type described in United States Letters Patent No. 1,079,994, December 2, 1913, to Schrage, the permissible full load current, particularly in the primary winding, varies at different speeds. The current in the secondary winding, while more nearly constant at different speeds, varies in frequency and at synchronous speed may be direct current of an unequal phase distribution in the secondary winding. Hence, an overload protection relay responsive merely to current magnitude in either the primary or secondary circuit, or both, is not very satisfactory, since it does not take into consideration the permissible full load current variation in the motor under different speed conditions. One attempt at solution of this type of problem is found in United States Letters Patent to Hull No. 1,893,328, January 3, 1933. However, this patented arrangement is not suitable except where the primary and secondary currents of the motor to be protected have a normal induction motor phase relationship.

In my invention I preferably employ a relay provided with two windings, the relays being of a type which responds to the vector sum of the currents in its windings. One relay winding is energized in proportion to the primary current of the motor and the other winding is energized by the constant current to a small artificial load, the power factor of which is selected so that the vector sum of the relay winding currents is of constant magnitude and proportional to the desired overload protection at all motor speeds notwithstanding considerable variation in the phase angle and magnitude of the permissible full load primary winding current at the different speeds. This scheme is suitable for a variety of conditions since the phase relation and relative magnitude of the two relay currents may be selected as desired.

Figure 5:
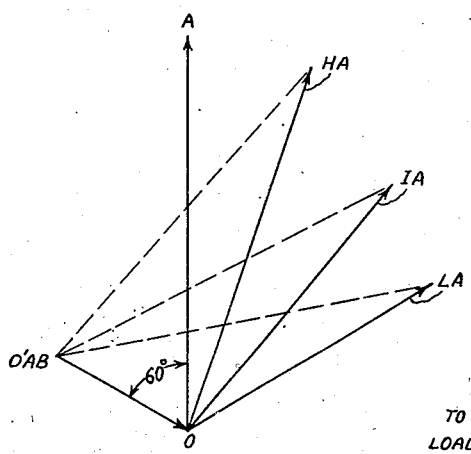
Figure 6:
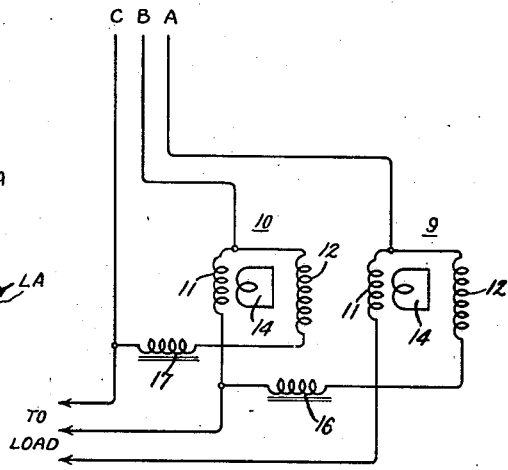
Figure 7:
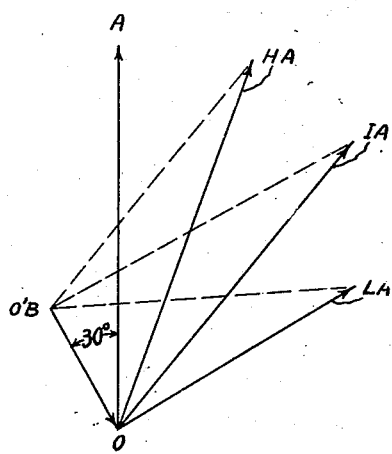
Figure 8:
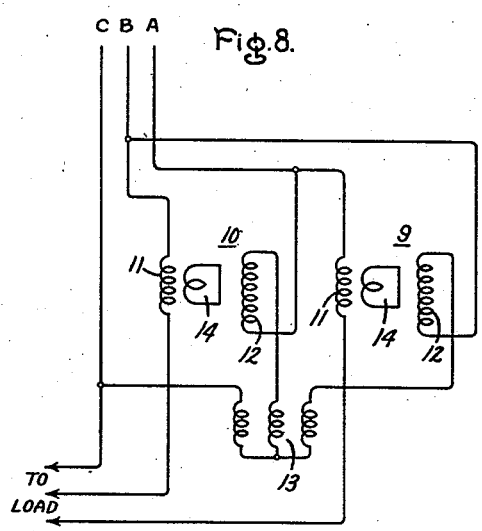
Figure 9:
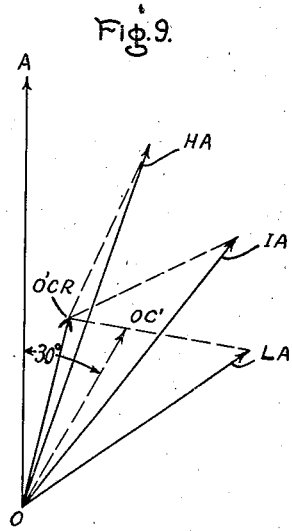
Figure 10:
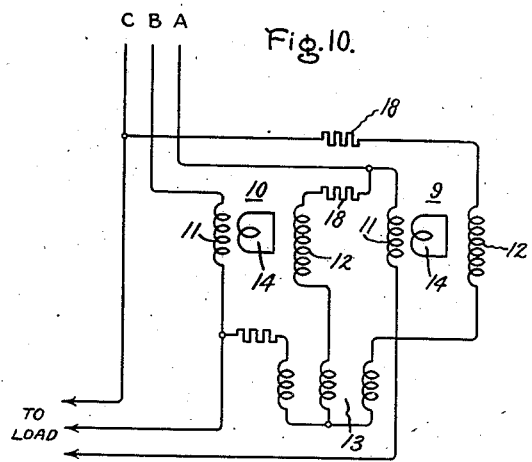
Figure 11:
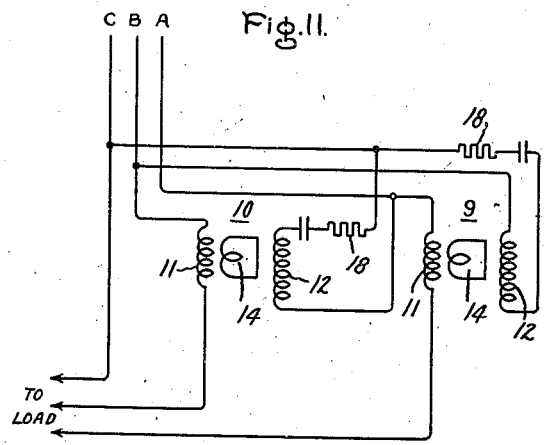
Figure 12:
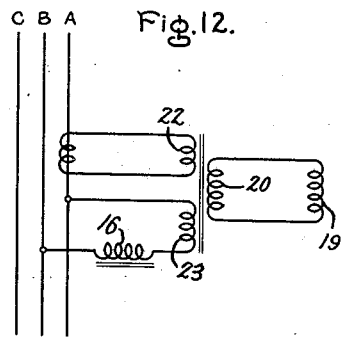

The features of my invention which are believed to be novel and patentable will be pointed out in the claims appended hereto. For a better understanding of my invention, reference is made in the following description to the accompanying drawings in which Fig. 1 represents a typical motor overload protecting system embodying my invention; Fig. 2 is a cross-sectional view of relay structure used in my invention; Figs. 3 and 4 are vector diagrams representing the vector relations of the relay winding currents of the relays 9 and 10 of Fig. 1; Figs. 5, 7, and 9 are vector diagrams for the phase A relay currents for motors having different line current speed relations; and Figs. 6, 8, and 10 show relay connections corresponding to the vector diagrams of Figs. 5, 7, and 9 respectively; Fig. 11 shows a relay connection corresponding to the vector diagram of Fig. 9, using capacitance instead of reactance to establish the phase relation of one of the relay currents; and Fig. 12 illustrates how the relay controlling currents may be combined vectorially before reaching the relay.

Referring to Fig. 1, I have represented my invention as applied for overload protection of a three-phase motor of the type described in previously mentioned Patent No. 1,079,994. Such a motor has a primary rotor winding 1 and a secondary stator winding 2. A commutator is connected to either the primary winding 1 or a separate winding 3 in inductive relation to winding 1 on the rotor, and the separate phases of the secondary winding are connected to the commutated winding through sets of brushes 4 and 5 which are adjustable about the commutator to control the speed and power factor of the motor. The motor is supplied solely through its primary winding 1 through slip rings 6 from a source, the three phases of which are designated as A, B, and C. An overload protecting circuit breaker 7 is provided represented as having a holding-in coil 8 under control of overload protecting relays at 9 and 10 in phases A and B. The relays may be of a standard type such as is described in United States Letters Patent No. 2,214,645, September 10, 1940, to Townsend except that the relays have two primary coils 11 and 12, coils 11 being represented as connected in series with phases A and B of the motor, and coils 12 being connected from their corresponding phases ahead of coils 11 to two phases of a small artificial three-phase load 13, the third phase of which is supplied from line phase C. For three-phase apparatus such relays could be connected in only one phase or in all three phases but protection for two phases is considered desirable and for three phases unnecessary. The relays 9 and 10 are of a type which have a closed secondary winding 14 in the form of a temperature sensitive bimetallic spiral (see Fig. 2) which is heated in response to the secondary current induced in it by transformer action to operate a contact control member 15 which in this case causes the opening of the control circuit in which holding-in coil 8 of circuit breaker 7 is connected. The contact control members 15 of the relays which are schematically illustrated in Fig. 1 are connected in series with coil 8 across a suitable source of supply which may be phases A and B as represented in Fig. 1 if the voltage is suitable and arranged to energize such coil when the contacts are closed and the circuit breaker 7 is closed.

It is evident that in this form of relay the secondary current in thermal response winding 14 will be proportional to the vector sum of the currents in the two primary windings 11 and 12, or, in this case, to the vector sum of the currents in the corresponding phases to the motor and to the artificial load 13.

To obtain the desired result for the purposes of my invention, the artificial load 13 of Fig. 1 is a selected power factor load comprising a three-phase reactor which causes the currents through the coils 12 to lag their exciting voltages.

In Fig. 3 let ABC represent the vector directions of the corresponding phase voltages such that OA represents the voltage from neutral to phase A. In the form of motor described the permissible full load current to the motor in phase A flowing in coil 11 of relay 9 may be represented by the vectors OHA for high speed, OIA for an intermediate speed, and OLA for low speed. It is seen that both the magnitude and phase angle of such full load current varies. The current lags the voltage and the amount of lagging increases with decrease in speed. Also the permissible full load current decreases with decrease in speed. It is evident that if a relay responsive to only such current were used and set to give protection at the low speed, it would not be possible to utilize the high speed, full load capacity of the motor. The current which flows through coil 12 of relay 9 lags approximately 90 degrees behind the voltage OA and may be represented by the vector O'AO. It is to be understood that the relative length of the current vectors of Fig. 3 does not necessarily represent the actual magnitude of the corresponding currents but rather, the ampere turns of the corresponding currents in the primary coils of relay 9. Current transformers may be used to energize the coils 11 and the coils 12 may have many more turns than coils 11.

The ampere turns of coil 12 of relay 9 represented by vector O'AO are constant and do not vary with motor speed. The resultant ampere turns of the secondary winding 14 are the vector sum of the primary ampere turns, or O'AHA at high speed, O'AIA at intermediate speed, and O'ALA at low speed. While the vector direction of the secondary current varies with changes in motor speed, its magnitude remains constant, the vector direction and magnitude of the current in winding 12 having been selected to that end. Hence, relay 9 will open its contact 15 when the permissible full load motor current is exceeded for a short length of time at the different speeds indicated, and for other intermediate speeds not indicated, and give the kind of protection desired.

Fig. 4 represents the vector relations of the currents of relay 10 of phase B where OB represents the phase B to neutral voltage; OO'B the ampere turns of coil 12 of relay 10; OLB, OIB, and OHB the permissible full load ampere turns of coil 11 of relay 10 at low, intermediate, and high speeds, respectively; and O'BLB, O'BIB, and O'BHB the resultant ampere turns of the secondary 14 of relay 10 at the corresponding speeds. These last-mentioned vectors are equal because point O₁B has been selected as the center of a circle the circumference of which passes through points LB, IB, and HB. The phase B current vectors of the motor for other speeds at the permissible full load will fall on or very close to such circle.

It is seen therefore that if either phase A or B is overloaded at any motor speed, one or the other of contacts 15 will open, deenergizing holding-in coil 8 allowing the circuit breaker 7 to open. When this happens, the secondaries 14 will cool and reclose their contacts whereupon the motor may again be used by closing circuit breaker 7.

It is evident that I could employ a capacitance artificial load at 13 by reversing the connections of windings 12.

Assume now that we have a motor drawing primary current, the permissible full load value of which at different speeds in phase A is represented by the vectors HA, IA, and LA of Fig. 5. To give proper overload protection at all speeds, I may employ the same type of relay but select the phase angle and ampere turn relation of the current in the coil 12 so as to be represented by the vector O'ABO, Fig. 5, such that the terminating point O'AB is the center of a circle the circumference of which passes through points HA, IA, and LA. Connections which will produce the desired vector relations for the relays are represented in Fig. 6 where 16 and 17 are suitable reactors connected as shown, reactor 16 and coil 12 of relay 9 being connected across phases A and B, and reactor 17 and coil 12 of relay 10 being connected across phases B and C.

The connections for producing vector relations shown in Fig. 7 is shown in Fig. 8, the vector relations for relay 9 only being shown. Here coil 12 of relay 9 is connected from phase B to neutral through the artificial three-phase reactance load 13. It is noted that coil 12 of relay 9, Fig. 8, is connected the same as coil 12 of relay 10, Fig. 1, except that the coil is reversed. Although not shown, connecting coil 12 of relay 9 across phases B and C through a reactor will cause the center of the desired circle to fall on vector OA. In the examples given, condenser artificial loads may be substituted for the reactors if the connections of the coils 12 are reversed.

Cases may arise where the desired vector direction of the current in coil 12 cannot be obtained by simple reactors or condensers in combination with the phase voltages. I may then resort to combinations of resistors and reactors or resistors and capacitors; and Fig. 9 shows vector relations for the relay 9 connected as shown in Fig. 10, suitable for protection of a load having the full load current vectors represented under different conditions.

If the resistance 18 in series with coil 12 of relay 9 were omitted, the connection of this coil from phase C to neutral through the reactor would be represented by vector OOC', Fig. 9. Including resistance in the circuit shifts the vector to the left by an amount proportional to the added resistance. For the load current vectors shown, the proper position for the center of the circle passing through the extremities of the current vectors is at point O'CR. Hence, the resistance represented at 18 is made such that the vector of the current in coil 12 of relay 9, Fig. 10, is O'CRO, Fig. 9.

Fig. 11 shows the relay connections for producing the vector relations of Fig. 9, using capacitance and resistances in series with the coils 12. It is to be understood that where resistance and reactances are shown in the circuit of coil 12, part or all of the same may be incorporated in the coil 12 itself.

Any two-coil relay may be used where the relay responds to the vector sum of the currents in its windings. Also, a single-coil relay may be used if energized by a current which is the vector resultant of the currents in question. For example, the current vectors may be combined in a separate current transformer and the resultant current fed to a single-coil relay as represented in Fig. 12, where 19 represents a protective relay energized from the secondary 20 of a current transformer having primary windings 22 and 23. Winding 22 is energized in response to the current in phase A either directly or through an ordinary current transformer and winding 23 is energized through a phase shifting device 16 from phases A and B. This will produce the same result as the relay 9 of Fig. 6.

The invention is generally applicable to single and polyphase alternating current load apparatus where it is desired that a relay shall respond to a combined function of load current and its phase angle.

What I claim as new and desire to secure by Letters Patent of the United States, is:

1. In combination with an alternating current source of supply, load apparatus supplied solely from said source, said apparatus drawing a current from said source which lags the supply voltage at various angles under different operating conditions, the permissible full load operating current of said apparatus decreasing with increases in such angle of lag, means drawing constant current from said source at a fixed phase angle, a relay for protecting said apparatus from overloads, means for energizing said relay in proportion to both of said currents, the magnitude and phase angle of the constant current being selected such that the operating influence on the relay of the vector sum of the constant current and the permissible full load operating current of said load apparatus under its different operating conditions is of constant magnitude and is of just under the value necessary to cause the operation of said relay.

2. In combination with an alternating current source, load apparatus supplied solely from said source and whose permissible full load operating current varies in magnitude and phase angle under different operating conditions, a circuit breaker between said source and load apparatus, a relay for causing the opening of said circuit breaker, a circuit drawing current from said source of a fixed magnitude and phase angle, connections for energizing said relay so that its operation is responsive to the vector sum of the variable load current of said apparatus and said fixed current, the magnitude and phase angle of the fixed current being selected to cause the relay to open the circuit breaker only in response to a current slightly greater than the permissible full load operating current of said load apparatus under its different operating conditions.

3. In combination with an alternating current source, load apparatus whose permissible full load operating current varies in magnitude and phase angle under different operating conditions supplied from said source, means drawing a constant current at a fixed phase angle from said source, a relay having two primary windings respectively supplied in proportion to such variable and fixed currents, a secondary winding for said relay in which flows a current proportional to the vector sum of its primary currents and to which the relay is responsive, the magnitude and phase angle of the fixed current being selected so that the relay will respond to a current slightly greater than the permissible full load operating current of the load under its different operating conditions.

4. In combination with an alternating current source, a variable speed alternating current motor supplied solely from said source, the permissible full load operating current of said motor being proportional to motor speed and having a lagging phase angle which increases with decrease in motor speed, a relay for protecting said motor against overload at all operating speeds energized in proportion to the load current of said motor, and means for energizing said relay from said source in proportion to a current having a fixed magnitude and phase angle both of which are selected such that the influence on the relay of the vector sum of the two energizing currents of said relay is a constant and of just the correct magnitude to operate the relay when the motor current is slightly more than its permissible full load value at any operating speed.

5. In combination with a source of alternating current, load apparatus supplied therefrom, said apparatus being of a type which operates under different conditions during which the permissible full load current varies in magnitude and phase angle, such that if the vectors of such current for a given phase were plotted with respect to the supply voltage for such phase the extremities of such vectors for the different operating conditions would fall substantially on a circle, a relay for protecting such apparatus from overload under its various operating conditions, means for deriving from said source a constant current the vector of which when plotted with respect to the aforesaid phase voltage terminates at the center of such circle, and connections for energizing said relay in proportion to the vector sum of said constant current and the corresponding phase current of said load apparatus.

6. Protective control apparatus adapted to be connected in an alternating current load circuit in which the permissible full load current varies in magnitude and phase angle with respect to the supply voltage in a predetermined manner under different load operating conditions, said apparatus comprising a relay having two primary windings and a single secondary winding, the current in the secondary winding being proportional to the vector sum of the currents in the two primary windings and determines the operation of the relay, connections for supplying one primary winding with such load current, means for supplying the other primary winding of said relay in parallel with said load with constant current of a phase angle selected to cause the operation of said relay only when the current in said load circuit exceeds its permissible full load value under the different operating conditions.

7. In combination with a variable speed alternating current motor having a primary winding adapted to receive its entire excitation through such winding and having a permissible full load primary operating current which varies in magnitude and phase angle with the motor speed, a relay responsive to the vector sum of its energizing currents for protecting said motor against overload at all operating speeds, connections for energizing said relay in response to the load current of said motor and connections for energizing said relay in parallel relation with said motor by another current of such value and phase angle that the relay is operated to protect said motor at all operating speeds only when the motor load current exceeds the permissible full load value corresponding to its speed.

PERCY W. ROBINSON.